Oct. 16, 1951     H. A. BING ET AL     2,571,661
FILM WINDING AND SHUTTER TENSIONING MECHANISM
Filed Feb. 4, 1948
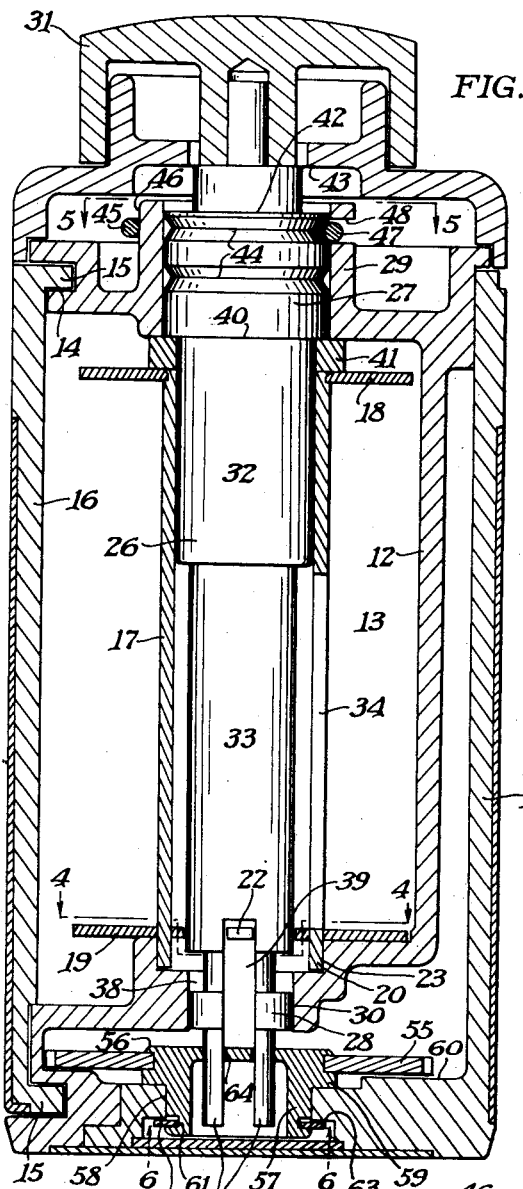
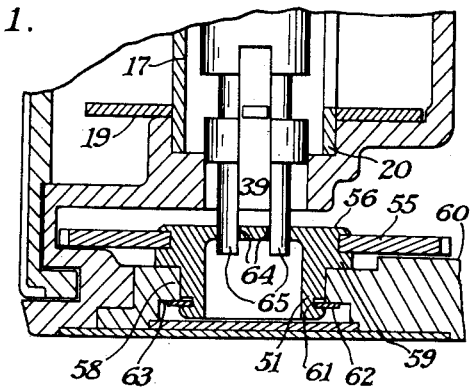
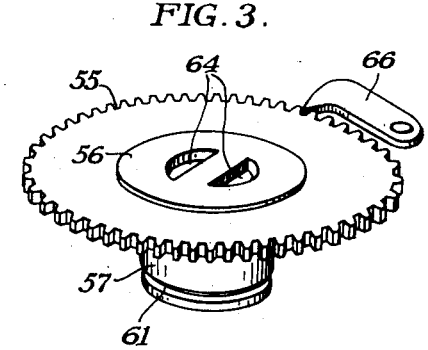
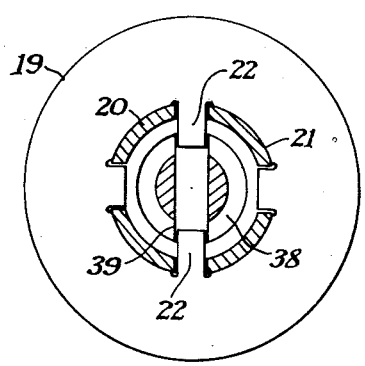
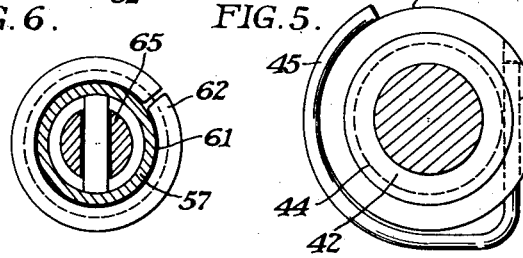
CLARENCE W. PRIBUS
HERBERT A. BING
INVENTORS
BY
ATTORNEYS Patented Oct. 16, 1951

2,571,661

UNITED STATES PATENT OFFICE 2,571,661

FILM WINDING AND SHUTTER TENSIONING MECHANISM

Herbert A. Bing and Clarence W. Pribus, Rochester, N. Y., assignors to Eastman Kodak Company, Rochester, N. Y., a corporation of New Jersey Application February 4, 1948, Serial No. 6,146

8 Claims. (Cl. 242—71)

1

The present invention relates to roll film cameras, and more particularly to cameras of this type in which the film is wound from a supply spool or retort onto a take-up spool; and, after the strip is exposed, it is rewound onto the supply spool or retort.

With cameras of this type, it is common practice to connect the take-up spool in driven relation with a drive means during the wind-up operation so that the film strip will be wound up on the take-up spool. When, however, the strip is to be rewound, the take-up spool is disconnected completely from the drive means so as to free the take-up spool which now idles so that it will be rotated slowly by the unwinding film. It is also common practice to connect the shutter tension mechanism to the drive means of the take-up spool so that when the latter is rotated to wind the film, the shutter will be simultaneously tensioned, but the shutter tensioning mechanism is disconnected from the take-up spool during the rewind operation.

The present invention has as its principal object the provision of a novel and simple means for disengageably connecting the take-up spool to the drive shaft.

A still further object of the invention is the provision of an arrangement by which the drive shaft and a part of the camera body cooperate to maintain the position of the take-up spool.

Yet another object of the invention is the provision of an axially movable shaft which may be connected to or disconnected from the take-up spool selectively, and which is held releasably in either of the adjusted positions.

Another object of the invention is the provision of a slidable connection between the spool drive means and the shutter tensioning means in which the drive means may be adjusted axially to disconnect the take-up spool to permit the tensioning of the shutter without winding the film so that an intentional double exposure may be made.

And yet another object of the invention is the provision of a novel means for retaining the shutter tensioning gear in substantial axial alignment with the drive shaft and in a fixed axial relation to the camera body.

To these and other ends, the invention resides in certain improvements and combinations of parts, all as will be hereinafter more fully described, the novel features being pointed out in the claims at the end of the specification.

In the drawings:

Fig. 1 is a sectional view through one end of a roll film camera, showing the relation to the take-up spool of the releasable winding mechanism constructed in accordance with the present invention, and with the parts in their connected relation;

2

Fig. 2 is a partial view of the mechanism illustrated in Fig. 1, showing the relation of the parts when the drive means is disconnected from the take-up spool;

Fig. 3 is a perspective view of the shutter tensioning gear which is connected to the drive means so as to tension the shutter upon rotation of the drive shaft;

Fig. 4 is a transverse sectional view taken substantially on line 4—4 of Fig. 1, showing the connection between the drive shaft and the take-up spool;

Fig. 5 is a transverse sectional view taken substantially on line 5—5 of Fig. 1, showing the arrangement by which the axially movable drive shaft is held releasably in either of its adjusted positions; and Fig. 6 is a transverse sectional view taken substantially on line 6—6 of Fig. 1, showing the spring ring for holding the shutter tensioning gear against axial movement in one direction.

Similar reference numerals throughout the various views indicate the same parts.

The winding mechanism of the present invention is shown as embodied in a roll film camera having a front plate 11 which carries a lens mount and is connected to a member 12 formed with a take-up spool cavity 13 and adapted to carry the film plane and supply spool, not shown. The member 12 is formed with a peripheral groove 14 adapted to receive a similarly shaped part 15 of the back 16 to provide the necessary light lock therebetween. As these parts do not per se constitute a part of the present invention, further details are not deemed necessary.

The cavity 13 has positioned therein a take-up spool which, in the present instance, comprises a tubular core 17 to the opposite ends of which are connected the end flanges 18 and 19. The core is formed with a plurality of depending lugs or fingers 20, in the present instance three, which extend through registering arcuate-shaped apertures or slots 21 in the lower end flange 19 and extend downwardly therefrom, as clearly shown in Fig. 1. The core 17 may be secured to flanges 18 and 19 in any suitable well-known manner to form a unitary structure. The projecting or depending fingers 20 engage an annular axially extending shoulder 23 which forms a lower bearing adapted to cooperate with an upper bearing, to be later described, to position the take-up spool in the cavity 13. The lower flange 19 is formed with a pair of diametrically arranged inwardly extending lugs 22 which project inwardly from the core 17, as best shown in Fig. 4, for a purpose to be hereinafter more fully described.

A drive shaft 26 extends through the core 17 of the take-up spool and is provided with upper and lower portions 27 and 28 which slidably engage axially-aligned bearing surfaces 29 and 30 on member 12 to slidably retain the shaft 26 in position relative to the take-up spool. The shaft has secured to the upper end thereof an actuating member which, in the preferred arrangement, is in the form of a manual-actuating knob 31, although any suitable drive means may be connected to the shaft to rotate the latter. The upper portion 32 of the shaft 26 within the core 17 is substantially the same size as the internal diameter of the core 17 so that the portion provides an upper bearing which cooperates with the aforementioned lower bearing 23 to support the spool in position in the spool cavity. The lower portion 33 of the shaft 26 within the core 17 is undercut opposite a film receiving slot 34 forming in the core 17 to permit the end of the film to be inserted through the slot to connect the film to the spool, as is apparent to those familiar with cameras of this type. Thus, the spool is held in position and concentric with the drive shaft 26 by reason of the bearings 23 and 32, as will be apparent from an inspection of Fig. 1.

The lower end of the drive shaft just above the portion 28 is formed with a peripheral groove 38 which communicates with an axial slot 39. The arrangement is such that when the shaft 26 is in its lower or driving position, as shown in Fig. 1, the slot 39 is adapted to receive the inwardly projecting lugs 22 of the take-up spool to connect the latter in a driven relation with the shaft 26. It will now be apparent that when the knob 31 is rotated, the shaft 26 will be similarly rotated; and, through the lug and slot connection 22 and 39, will rotate the take-up spool as a unit with the drive shaft. Means, to be later described, limits the rotation of the shaft 26 to one direction so that when the parts are in the position shown in Fig. 1, the rotation of the shaft 26 will wind up the film on the take-up spool. However, when the knob 31 is grasped, and the shaft is slid upwardly in an axial direction to the position shown in Fig. 2, the slot 39 is then moved out of cooperating relation with the lugs 22 and the latter now registers with the peripheral groove 38. The take-up spool is now disconnected completely from the drive shaft, and when the supply spool is rotated to unwind the film, the take-up spool idles and is rotated slowly by the unwinding film, the lugs 22 moving in the peripheral groove 38 and the drive shaft remaining stationary.

When the shaft 26 is moved to its lower operative position, shown in Fig. 1, the under surface 40 of the portion 27 engages a spacing washer 41 positioned between the upper flange 18 of the take-up spool and the bearing 29 to limit the downward movement of the shaft 26 to position the slot 39 and lugs 22 in cooperating relation to clutch the drive shaft 26 of the take-up spool, as is apparent from an inspection of Fig. 1. When, however, the shaft 26 is moved upwardly to position the parts in the relation shown in Fig. 2, the upper surface 42 of the portion 27 finally engages a shoulder or surface 43 formed on part 12 to limit the upward movement of the shaft 26. Thus, the washer 41 and the shoulder 43 limit the downward and upward movement respectively of the drive shaft to position the parts in the relation shown in Figs. 1 and 2.

When the shaft 26 is thus moved, it is desirable to retain the shaft in its adjusted position. To the end, portion 27 of shaft 26 is formed with a pair of axially-spaced V-shaped peripheral grooves 44. A U-shaped spring member has a portion 45 thereof tightly engaging the outer surface 46 of the bearing 29, while the other end 47 is bent, in the manner shown in Fig. 5, and extends into a slot 48 formed in the bearing 29 and into position to engage selectively in one of the slots 44, as will be apparent from an inspection of Fig. 1. Thus, when the shaft is in the position as shown in Fig. 1, the portion 47 of the spring will be seated in the upper U-shaped groove 44 to yieldably and releasably hold the shaft in its lower position. When, however, the shaft 26 is moved upwardly to its position shown in Fig. 2, by pulling upwardly on the knob 31, the lower portion of the upper U-shaped slot 44 first cams the portion 47 of the spring radially or to the right out of the upper slot 44. Continued upward movement of the shaft 26 will then cause the portion 47 of the spring to ride along the outer surface 49 of the portion 27 until the shaft is finally stopped by reason of the engagement of the surface 42 with the shoulder 43. At this time, the portion 47 of the spring will then register with the lower slot 44 and snap therein to hold the shaft automatically and releasably in its upper position to disconnect the shaft 26 completely from the take-up spool to free the latter. Thus, the spring, Fig. 5, cooperates with the grooves 44 selectively to hold the shaft 26 releasably in either of the adjusted positions.

It is sometimes desirable to connect the film winding mechanism to the shutter tensioning mechanism so that the latter may be operated during the film winding operation. To secure this result, a gear 55 is mounted adjacent the take-up spool and is connected, in any suitable well-known manner, to the shutter tensioning mechanism. As the latter does not constitute a part of the present invention, details thereof are not illustrated or described. In order that the gear may be operated in proper timed relation to the winding of the film, it is desirable to connect the gear to the drive shaft 26 so as to be actuated thereby. In the preferred arrangement, the gear 55 is secured to or formed integral with an inverted cup-shaped or tubular sleeve member comprising a top 56 and a depending tubular portion 57 which is journaled in a bearing 58 formed in the lower end of the member 12 and in substantial axial alignment with the shaft 26, as clearly illustrated in Figs. 1 and 2. Thus, the gear 55 is mounted and supported in the member 12 independently of the drive shaft and in substantial axial alignment therewith. This arrangement facilitates manufacture and assembly. In order to retain the gear in a fixed position axially, the tubular sleeve 57 is formed with an upper flange 59 which rests on the top 60 of the bearing 58. The lower end of the sleeve 57 extends below the bearing 58 and is formed with a peripheral groove 61 in which is snapped a split flexible ring 62, as best shown in Fig. 6. This ring projects radially from the sleeve 57 and engages the under-surface 63 of the bearing 58 and cooperates with the flange 59 to retain the gear 55 and its supporting member against axial movement.

Thus, the gear 55 is held fixedly axially but is free to rotate relative to the member 12. However, in order that such rotation will be in proper timed relation with the winding operation, this gear is connected directly to the drive shaft 26 so as to rotate as a unit therewith. It will be remembered, however, that the drive shaft is moved axially from its film winding position shown in Fig. 1 to its disconnected position shown in Fig. 2. Thus, it is necessary to connect an axially-fixed gear to an axially-movable drive shaft 26 for unitary rotation therewith. To secure this result, a spline or sliding connection is provided between the shaft 26 and the gear 55. To this end, the top 53 of the gear supporting member is formed with a pair of radially-spaced semi-circular holes or apertures 64 through which somewhat similarly shaped but slightly smaller depending fingers 65 of the shaft 26 project, as clearly shown in Figs. 1 and 2. Obviously, any desired shaped cooperating fingers and apertures may be provided. As the shaft 26 is slid axially, the fingers 65 slide in the aperture 64 but are never withdrawn therefrom, as is apparent from an inspection of Figs. 1 and 2, so that the shaft 26 will always be in driving relation with the gear 55 to rotate the latter to tension the shutter whenever the shaft is rotated. The fingers and apertures thus provide a spline connection between the drive shaft and the gear which permits the necessary axial movement of the part, but assures unitary rotation.

A pawl 66 pivoted on the member 12 engages the gear 55 to lock the latter, and hence the shaft 26, against rotation in one direction so that the shaft can only be rotated in the direction to wind the film on the take-up spool, the advantage of which will be readily apparent to those familiar with cameras of this type. During such winding operation, however, the shutter will be also tensioned, as will be apparent. By separately mounting the gear in substantial alignment with the shaft, and providing a spline connection therebetween, slight production errors in alignment of shaft and gears are permissible without interfering with the separate operation of the parts.

In normal operation, the shutter is tensioned only during the film winding operation and the parts will then be in the position shown in Fig. 1. When, however, the film is to be rewound on the supply spool, the shaft 26 is slid to the position shown in Fig. 2, to disconnect the shaft from the take-up spool. It will be noted, however, that the shaft is still operatively connected to the gear 55 and may rotate the latter independent of the take-up spool, such rotation being, of course, restricted by the pawl 66. Such rotation may be desired when an intentional double exposure is to be made. Thus, when the parts are in the position shown in Fig. 1, and after the exposures have been made, the shaft 22 may be slid to the position shown in Fig. 2 to disconnect the film spool, the shaft 26 and gear 25 are then rotated to tension the shutter. However, as the take-up spool is disconnected from the drive shaft, the film is not wound during the tensioning operation and a separate exposure may then be made on a previously exposed film area. Then the shaft may be moved axially to the position shown in Fig. 1 so that a new film area may be wound into position and the shutter simultaneously tensioned. Thus, the rotation of the shaft may be utilized both to wind the film and to tension the shutter or the shaft may be disconnected from the take-up spool and then employed to tension the shutter only to permit the taking of an intentional double exposure, the advantage of which will be apparent to those familiar with cameras of this type.

The present invention thus provides a simple and novel film winding and shutter tensioning mechanism by which the winding operation and the shutter tensioning are in proper timed relation. In addition, the take-up spool may be disconnected completely from the shutter tensioning mechanism so that the latter may be separately operated to permit the making of an intentional double exposure. Also, when the drive shaft is disconnected from the take-up spool the latter is free and may be rotated in a reverse direction so that the film may be unwound or wound back on the take-up spool or retort. A drive gear for the tensioning mechanism may be independently mounted and connected to the drive gear by a novel arrangement which permits slight axial misalignment of the parts without affecting their cooperating action.

While one embodiment of the invention has been disclosed, it is understood that the inventive idea may be carried out in a number of ways. This application is, therefore, not to be limited to the precise details described, but is intended to cover all variations and modifications thereof falling within the scope of the appended claims.

We claim:

1. In a film winding mechanism for a camera, the combination with a camera body, of a film winding spool positioned within said body and adapted to be rotated to wind film thereon, an axially movable shaft slidably mounted on said body and extending completely through said spool, said shaft being movable axially relative to said spool to one position, means for connecting said shaft to said spool when in said one position, a stationary bearing on said body engaging one end of said shaft adjacent one end of said spool, a sliding bearing on said shaft engaging said body adjacent the opposite end of said spool and cooperating with said stationary bearing to position said shaft in said body and in operative relation with said spool, means for rotating said shaft to rotate said spool as a unit therewith to wind the film on said spool, means to slide said shaft axially into and out of connected relation with said spool, means to limit the axial movement of said shaft, and means for yieldably and releasably holding said shaft selectively in either of its axial positions.

2. In a film winding mechanism for a camera, the combination with a camera body, of a film winding spool positioned within said body and adapted to be rotated in one direction to wind film thereon, an axially movable shaft extending concentrically completely through said spool and supported by said body, cooperating means on said body and shaft adjacent opposite ends of said spool for retaining said spool concentric with said shaft, said shaft having an axially extending open-end slot formed therein, a radially extending lug formed on said spool in axial alignment with said slot to connect said spool in operative relation with said shaft for rotation as a unit therewith, means for rotating said shaft, said shaft being axially movable to disengage said lug from said slot to disconnect said spool to free the latter from said shaft, means to limit the axial movement of said shaft, and resilient means for holding said shaft in either the connected or disengaged position.

3. In a film winding mechanism for a camera, the combination with a camera body, of a film winding spool positioned within said body and adapted to be rotated in one direction to wind film thereon, end flanges on said spool, an axially movable shaft extending concentrically and completely through said spool and supported by said body, cooperating means on said body and shaft for retaining said spool concentric with said shaft, said shaft having an axially extending open-end slot formed therein, a radially extending lug formed on said spool in axial alignment with said slot, said shaft being axially movable to position said lug in said slot to connect said spool in operative relation with said shaft for rotation as a unit therewith, means for rotating said shaft, said shaft being axially movable to disengage said lug from said slot to disconnect said spool to free the latter from said shaft, means to limit the axial movement of said shaft, resilient means for holding said shaft in either the connected or disengaged position, and bearing means on said body engaging the opposite ends of said shaft adjacent said flanges to position the latter slidably within said spool.

4. In a film winding mechanism for a camera, the combination with a camera body, of a film winding spool positioned within said body and adapted to be rotated to wind film thereon, an axially movable shaft, means to connect said shaft releasably to said spool, means to rotate said shaft in one direction to wind the film on said spool, said shaft being movable axially to one position to connect the spool automatically to said shaft and movable axially to another position to disconnect said shaft from said spool, a gear, means independent of said shaft for positioning said gear in said body in substantial axial alignment with said shaft, and a slidable connection between said shaft and gear so that the latter may be rotated upon rotation of said shaft in either of said positions.

5. In a film winding mechanism for a camera, the combination with a camera body, of a film winding spool positioned within said body and adapted to be rotated to wind film thereon, an axially movable shaft, means to connect said shaft releasably to said spool, means to rotate said shaft in one direction to wind the film on said spool, said shaft being movable axially to one position to connect the spool automatically to said shaft and movable axially to another position to disconnect said shaft from said spool, a gear, means independent of said shaft for positioning said gear in said body in substantial axial alignment with said shaft, a slidable connection between said shaft and gear so that the latter may be rotated upon rotation of said shaft in either of said positions, and means for retaining said gear against axial movement relative to said body.

6. In a film winding mechanism for a camera, the combination with a camera body, of a film winding spool positioned within said body and adapted to be rotated to wind film thereon, an axially movable shaft, means to connect said shaft releasably to said spool, means to rotate said shaft in one direction to wind the film on said spool, said shaft being movable axially to one position to connect the spool automatically to said shaft and movable axially to another position to disconnect said shaft from said spool, a gear, a tubular sleeve carried by said gear, a bearing formed in said body and engaging said sleeve to retain said sleeve and gear in substantial axial alignment with said shaft, means including a member carried by said sleeve and cooperating with said bearing to retain said gear and sleeve against axial movement relative to said body, and a spline connection between said shaft and gear so that the latter will rotate as a unit with said shaft but permitting axial movement of said shaft relative to said gear.

7. In a film winding mechanism for a camera, the combination with a camera body, of a film winding spool positioned within said body and adapted to be rotated to wind film thereon, an axially movable shaft, means to connect said shaft releasably to said spool, means to rotate said shaft in one direction to wind the film on said spool, said shaft being movable axially to one position to connect the spool automatically to said shaft and movable axially to another position to disconnect said shaft from said spool, a gear, a tubular sleeve carried by said gear, a bearing formed on said body and engaging said sleeve to retain said sleeve and gear in substantial axial alignment with said shaft, means including a member carried by said sleeve and cooperating with said bearing to retain said gear and sleeve against axial movement relative to said body, said sleeve being formed with a pair of radially spaced openings, and a pair of depending fingers formed on said shaft extending through said opening to spline said shaft to said gear so that the latter will rotate as a unit with said shaft but permitting relative axial movement of said shaft.

8. In a film winding mechanism for a camera, the combination with a camera body, of a film winding spool positioned within said body and adapted to be rotated to wind film thereon, an axially movable shaft, means to connect said shaft releasably to said spool, means to rotate said shaft in one direction to wind the film on said spool, said shaft being movable axially to one position to connect the spool automatically to said shaft and movable axially to another position to disconnect said shaft from said spool, means for retaining said shaft releasably in either of said positions, a rotatable gear carried by said body, a bearing on said body, a tubular member carried by said gear and engaging said bearing to position said gear in substantial axial alignment with said shaft, said member being formed with an annular slot, a spring member positioned in and projecting radially from said annular slot, a support on said body for said tubular member, a shoulder formed on said body and adapted to engage the projecting portion of said spring member and cooperating with said support to retain said gear and sleeve against axial movement relative to said body, said tubular member being formed with radially spaced openings, and depending fingers formed on said shaft and extending into said openings to provide a spline connection between said shaft and gear so that the latter will rotate upon rotation of said gear but permitting axial movement of the shaft relative to said gear.

HERBERT A. BING.
CLARENCE W. PRIBUS.

REFERENCES CITED

The following references are of record in the file of this patent:

UNITED STATES PATENTS

| Number | Name | Date |
|---|---|---|
| 1,029,266 | Bornmann | June 11, 1912 |
| 1,236,271 | Corrodi | Aug. 7, 1917 |
| 1,243,270 | Dietz | Oct. 16, 1917 |
| 2,063,330 | Nagel | Dec. 8, 1936 |
| 2,241,122 | Drotning | May 6, 1941 |

FOREIGN PATENTS

| Number | Country | Date |
|---|---|---|
| 867,527 | France | Aug. 4, 1941 |